(12) United States Patent
Leyvi

(10) Patent No.: US 6,625,389 B1
(45) Date of Patent: Sep. 23, 2003

(54) VIDEO TAPE HIERARCHICAL INDEXING SYSTEM

(75) Inventor: Evginiy Leyvi, Fairlawn, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/408,785

(22) Filed: Sep. 30, 1999

(51) Int. Cl.$^7$ .............................. H04N 5/93; H04N 7/08
(52) U.S. Cl. ........................................... 386/92; 386/52
(58) Field of Search .............................. 386/92, 46, 95, 386/52, 55, 1, 4, 6, 57, 68, 69, 81; 707/100, 2; 711/112; H04N 5/93, 7/08

(56) References Cited

U.S. PATENT DOCUMENTS

| | | | |
|---|---|---|---|
| 5,390,027 A | 2/1995 | Henmi et al. | 358/335 |
| 5,497,240 A | 3/1996 | Yoo | 358/335 |
| 5,913,010 A * | 6/1999 | Kaneshige et al. | |
| 6,349,294 B1 * | 2/2002 | Shaath et al. | |

FOREIGN PATENT DOCUMENTS

| | | |
|---|---|---|
| EP | 0424903 A2 | 5/1991 |
| EP | 0485740 A1 | 5/1992 |

* cited by examiner

Primary Examiner—Robert Chevalier
(74) Attorney, Agent, or Firm—Laurie E. Cathman

(57) ABSTRACT

A video indexing system provides a hierarchical ordered structure of video data on a sequentially accessed storage medium, such as a video tape. The index structure groups different portions of the video data together and establishes relationships between those portions. The arrangement of the index structure can be varied depending on the desires of an individual user. The inventive arrangement provides greater flexibility in viewing the contents of analog video tapes, for example and allows a user to add descriptive information that facilitates choosing the portions of the video data to be viewed.

28 Claims, 3 Drawing Sheets

VIDEO TAPE HIERARCHICAL INDEXING SYSTEM

BACKGROUND OF THE INVENTION

1. Field of the Invention

This invention is directed to a system that creates and provides an index of information stored in video data where the portions of the video data are grouped in an organized structure. The portions of video data are preferably placed into different levels with links to corresponding portions in other levels such that some of the portions are regarded as components of other portions. For example, a recording session includes a plurality of scenes that in turn, each include a plurality of frames. The indexing system of this invention arranges the recording sessions, scenes and frames in an organized structure that reveals the relationships between the various portions.

2. Description of the Related Art

A variety of systems are commercially available for storing and accessing video data. Examples include digital video disks, compact disks (i.e., CD ROM) and VHS video tapes. The digital storage medium allow for relatively easy selection of portions of the video data for viewing because of the manner in which the digital data is stored. This is not true, however, for other storage medium such as video tapes where data locations are not directly accessible from any point. One major drawback associated with analog video tapes compared to digital storage medium is that an individual typically needs to scroll through the tape to locate desired portions. This process can be tedious and generally is not accurate. Further, it often proves frustrating and renders editing information on a video tape difficult.

Recent advancemets have been proposed to simplify the task of locating information on analog video storage medium. For example, one system known as the VHS index search system (VISS) places an electronic marker at the beginning of each new recording session on a video tape. Recording sessions can be, for example, movies or different events that are recorded using a recorder. The electronic markers are then utilized by a video player to recognize the beginning of the various sessions. This simplifies the task of moving between different sessions on a video tape when viewing the recorded images or editing the content of a video tape.

While the VISS approach has proved useful in some circumstances, it is not without shortcomings and drawbacks. One limitation on the VISS approach is that it does not permit a user to place identifying information along with the electronic markers. Therefore, without maintaining some separate record of what is contained at each marker, a user is left frustrated trying to locate a particular recorded image. Further, the electronic VISS markers are not distinguishable and do not facilitate locating particular data without an additional record of each pulse.

Other proposals have been made to include identifiers of different portions of video data within a recording session in addition to identifying the beginning point of each session. An example of this is shown in the published European Patent Application EP0424903. Such an arrangement, however, has been limited to digital recording medium such as a CD ROM. Additionally, previous proposals have not provided users with enough flexibility when accessing the video data.

There is a need for an improved video indexing system and particularly one that allows a structured indexing of analog video data. This invention addresses that need while avoiding the shortcomings and drawbacks of the prior art.

SUMMARY OF THE INVENTION

In general terms, this invention is a video indexing system for indexing portions of video data on a sequentially accessed storage medium for selectively viewing the portions in a chosen order. The portions of video data are indexed in a structured arrangement that allows a user to selectively group different portions and to view the various portions in any chosen order.

A system designed according to this invention includes several basic components. A video player portion reads the video data that is stored on the storage medium and generates signals that correspond to the content of the video data. A recorder portion selectively writes information on the storage medium. A controller communicates with the video player portion and the recorder portion. The controller utilizes the signals from the video player portion and determines locations of the various portions of the video data on the storage medium. The controller directs the recorder portion to assign an identifier to the location of each portion. The controller utilizes operator input and arranges the portions in a structured arrangement where at least a first one of the identifiers is related to a second one of the identifiers such that the portion of video data corresponding to the second identifier is a component of the video portion corresponding to the first identifier.

The controller of this invention can provide an ordered, structured arrangement of the video portions automatically or responsive to a user's intentions as communicated through a keypad, for example.

Another aspect of this invention is a method of indexing portions of video data for selectively viewing the portions in a chosen order. The method includes several basic steps. First, locations of the portions of the video data on the storage medium is determined. An identifier is assigned to the location of each portion. The identifiers are the arranged into an arrangement wherein at least one of the identifiers is related to another one of the identifiers such that the portions corresponding to the latter identifier is a component of the portion corresponding to the first identifier.

Another aspect of this invention includes placing a number of computer-executable instructions on a computer readable medium so that process steps can be executed by the computer for indexing the video data. The computer-readable medium includes a first program module for determining locations of the portions of the video data on a video storage medium. A second program module is included for assigning an identifier to the location of each portion. A third program module is responsive to user input and provides instructions for arranging the identifiers into an arrangement where at least a first one of the identifiers is related to a second one of the identifiers such that the video portion corresponding to the second identifier is a component of the video portion corresponding to the first identifier.

The inventive video indexing system provides additional detail and more convenient access to a user who desires to view selected portions of the video data. Additionally, the inventive arrangement allows a user greater flexibility in grouping or linking different portions of the video data independent of the physical location of the portions on the storage medium The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
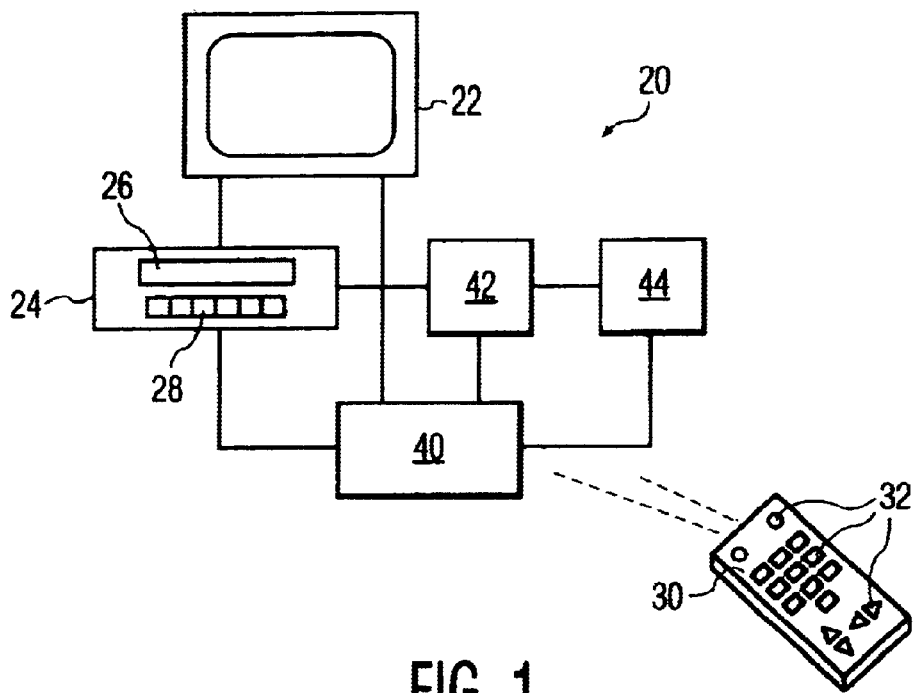
FIG. 1 schematically illustrates a system designed according to this invention.

FIG. 1 diagrammatically illustrates a system 20 for indexing the video data that has been stored on a sequentially accessed storage medium, such as a video tape. Sequentially accessed storage media are the type that do not have data locations that are directly accessible from any point. Analog magnetic video tapes are one example of sequentially accessed storage media. The system 20 includes a display device 22, such as a conventional television monitor. A video player portion 24 includes components 26 that access the video data on the storage medium to generate signals that result in a visual image on the display device 22. The video player portion 24 includes a plurality of control switches 28 to operate the player in a desired mode of operation as is known in the art.

Additionally, a user input device 30 is useful for controlling the operation of the video player 24 and other components of the system 20. In the illustrated example, the user imput device 30 is a hand-held, remote control device as generally known in the art. The operator input device 30 includes a keypad 32 having a variety of switches that are operated in a conventional manner to achieve a desired communication or result.

The system 20 includes a controller 40 that is useful for generating an index of the video data stored on a storage medium, such as a video tape. The controller 40 communicates with the video player portion 24 and the display device 22. The controller 40 also communicates with a video data memory portion 42 and writing portion 44, whose functions will be described in more detail below. Additionally, the controller 40 preferably receives signals from the user input device 30 and responsively takes appropriate action for operating the system 20.

The illustration in FIG. 1 shows separate components or modules for the controller 40, the memory 42, the write portion 44 and the video player 24, for example. The distinctions among these portions of the system 20 are for illustration purposes only. Given this description, those skilled in the art will realize that the controller 40, memory portion 42 and write portion 44 could all be realized within a single microcontroller, for example. Additionally, the various components of the system 20 could be housed within a single unit having the video player portion 24, the display device 22 and the associated electronics. Alternatively, the controller 40, memory 42 and write portion 44 could be realized through a separate external device such as a personal laptop computer. Further, the user input device need not be a handheld, remote control keypad as illustrated, but could be a computer mouse or keyboard input device. The arrangement of components of a system 20 designed according to this invention can be varied to suit the needs of a particular circumstance.

Figure 2:
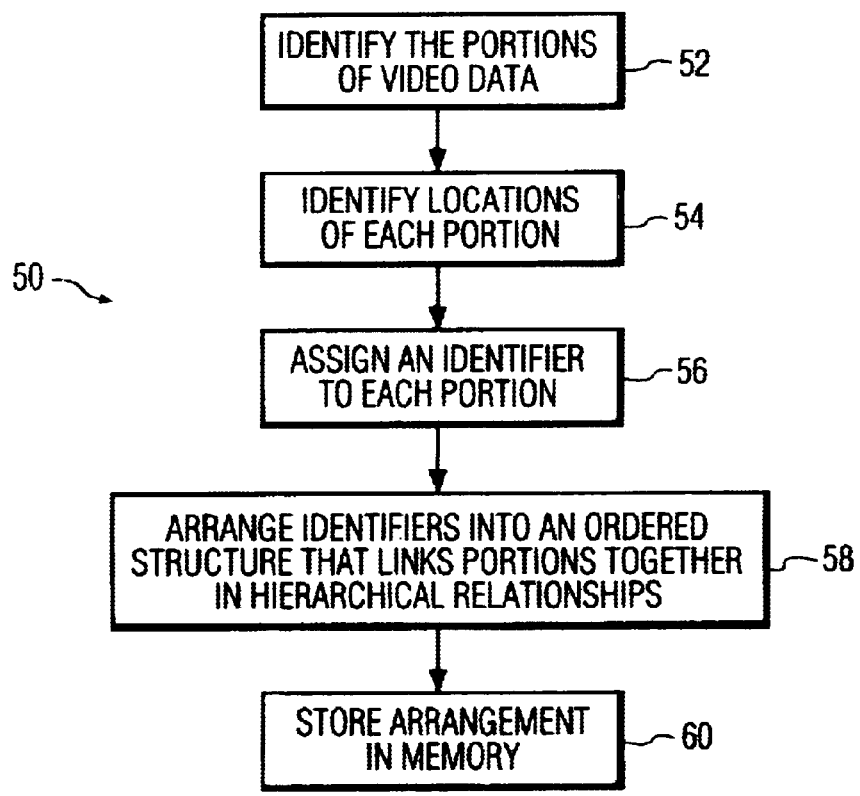
FIG. 2 is a flowchart diagram summarizing an implementation of the method of this invention.

The system 20 generates an index of video data on the storage medium and provides a structured arrangement of the data that allows selected access to chosen portions of the video data. The flow chart 50 in FIG. 2 summarizes the overall method associated with this invention.

First, the portions of video data are identified at 52. Identifying portions of the video data can be accomplished in various ways. The preferred embodiment includes utilizing the controller 40 to identify distinct portions, such as scenes on the video. In one example, the controller 40 receives analog video signals from the player portion 24. The analog signals are then converted into digital signals and frames of the video data are identified as is known in the art. The controller 40 then extracts key frames to identify changes between different portions of the video data.

In one example, the controller 40 analyzes the digitized video data in a frame by frame sequence. Characteristics of each frame such as an average brightness, luminance, chrominance or other attributes or a combination of them is determined. Then the determined frame characteristic is compared to the same characteristic of an adjacent frame. If the difference between the two frame characteristics exceeds a preselected threshold, the second of the two frames is identified as the beginning of the new portion of the video data. In other words, when there is a change in the content of the video data in one frame compared to the next, the latter frame is identified as the beginning of a new portion. For example, if a portion of the video was recorded outdoors on a sunny day, the average brightness of that portion will be much greater-than a recording made indoors, at night. This information is used to identify the various portions of the video data.

The location of each portion of video data is identified at 54. The location of each portion preferably is initially determined relative to a beginning point of the storage medium. Alternatively, some indexing reference point can be established on the storage medium provided that it is possible to locate the various portions of the video data on the storage medium.

At 56, an identifier is assigned to each portion of the video data. The preferred embodiment includes using video address search system (VASS) markers as the identifiers. VASS markers are described, for example, in the publication known as ANSI/SMPTE Standard 12M-1995, the contents of which are incorporated by reference into the specification.

Once the video portions are identified, using VASS markers for example, the identifiers can then be arranged in a useful order. At 58, using an interactive process with a user the identifiers are arranged into an ordered structure that links portions of the video data together in hierarchical relationships. The relationships between video portions establish links such that sub-portions or components of different recording sessions are identified and grouped for later access. The structured arrangement preferably is stored in memory at 60. The structured arrangement can be stored in the memory 42 or, alternatively, recorded on the storage medium that contains the video data using the write portion 44.

Figure 3:
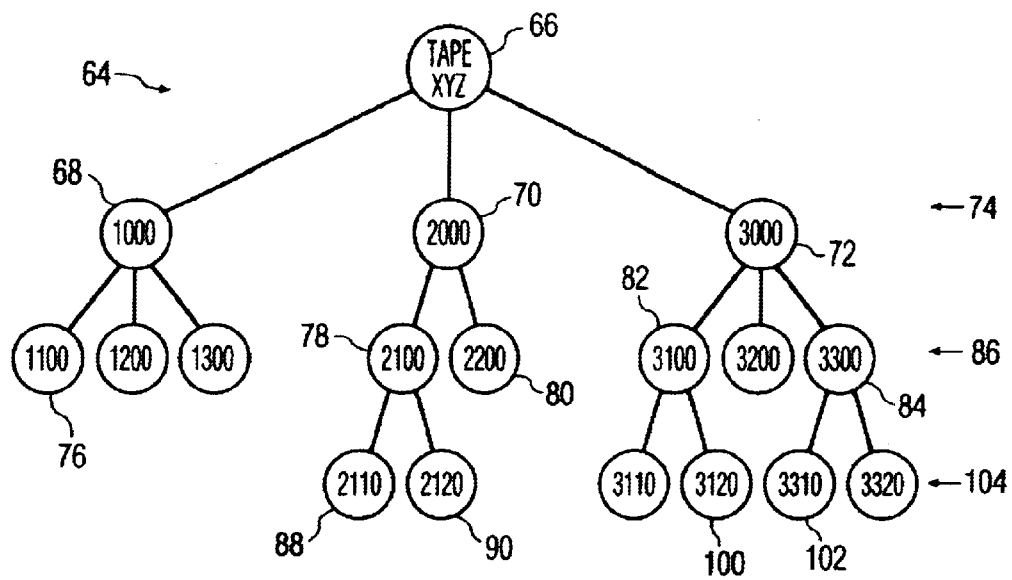
FIG. 3 diagrammatically illustrates a structured index arrangement of video data made according to this invention.

FIG. 3 diagrammatically illustrates a hierarchical structured arrangement 64 designed according to this invention. A first identifier 66 identifies the storage medium, giving it a title. This title can be automatically assigned by the controller 40 or chosen by an individual using the user input device 30, for example.

The different sessions on the storage medium are identified and the identifiers corresponding to the beginning of each session are placed into a first level. Identifiers 68, 70 and 72 are in a first level 74 in the illustration of FIG. 3. Each session may include a plurality of scenes, for example. The identifiers corresponding to the beginning of each scene within a session preferably are placed in a second level and linked to the corresponding session identifier in the first level 74. The scene identifier 76 is a component of session 68 while the scenes identified at 78 and 80 are components of the session 70. Similarly, the session 72 includes a plurality of scenes including 82 and 84. The identifiers corresponding to the beginning of each scene, which are referred to as scene identifiers in the description, preferably are placed in a second level 86.

Each scene, in turn, can include a plurality of video portions. The level of detail can extend to individual frames of the video data. In FIG. 3, frame identifiers 88, 90, 100 and 102 are stored in a third level 104.

One feature of this invention is that upon identifying the different video sessions, identifiers are assigned in the first level 74 such as the numbers 1000, 2000 and 3000, respectively. The identifiers at the second level 86 preferably fit within a range between adjacent identifiers in the first level 74. For example, the identifier 76 has a value 1100 that is between the values 1000 and 2000, which correspond to the identifier 68 and 70, respectively. With each progressive level in the hierarchical structure 64, the identifiers preferably have numerical values that appear to be natural subcategories or components of the identifier to which they are linked at the next higher level as shown in FIG. 3. Such a numeral ordering of identifiers can correspond to the sequential appearance of the portions of the video data on the storage medium. They need not follow a sequential order, however. Moreover, a system designed according to this invention provides a user with the flexibility of reassigning identifiers and identifier values based upon the desired structure of the hierarchical order.

Figure 4:
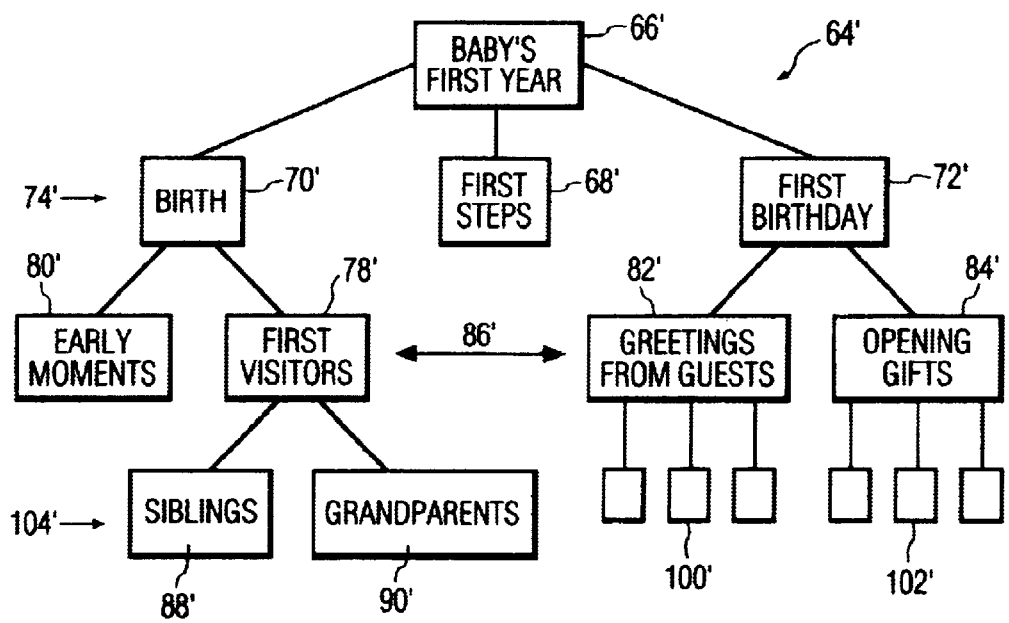
FIG. 4 diagrammatically illustrates another example arrangement of video data made according to this invention.

While FIG. 3 generically shows an index 64 designed according to this invention, FIG. 4 illustrates a more concrete example. The index structure 64' includes a tape identifier 66'. This particular video tape has different recording sessions that were recorded during a child's first year of life. One of the recording sessions records the baby's first steps at 68'. Another recording session 70' was recorded at the hospital where the baby was born. The third recording session 72' captured the baby's first birthday party. The recording session identifiers 68', 70', and 72' preferably are stored at a first level 74'.

The second level 86' includes groupings or scenes 78' and 80', which are components of the birth recording sessions 70'. The scene 78' includes images of the different individuals who were visitors at the hospital such as siblings grouped as a portion 88' and grandparents grouped as a portion 90', which are recorded at a third level 104'. Similarly, the first birthday recording session 72' includes two groupings at the second level 86'. One grouping of video portions 82' includes all of the various greetings or well wishes from the guests at the party. Another grouping 84' includes the various gifts that were given at the first birthday party.

As can be appreciated from FIG. 4, the different recording sessions and the components within each session, need not have the same level of detail in the index structure 64'. For example, the recording session 68' showing the baby's first steps need not have identifications of different scenes or portions within that recording session. Moreover, further levels of detail beyond that illustrated in FIG. 4 could be incorporated into the structure 64'.

A significant advantage of this invention is that a user is allowed to assign written identification information that describes the content of the various video portions. Written identifiers as shown in FIG. 4, for example, can be incorporated by the user appropiately entering the information using the user input device 30. The controller 40 preferably assigns the chosen description to each portion of the index. In the preferred embodiment, the index is displayed on the display device 22 so that a user can enter the information and verify its accuracy. Additionally, the display preferably is controlled by a user's choice to display whatever level of detail is desired. For example, upon inserting a video tape into the player 24, the user may want only to display the tape identification 66 and the first level 74 in order to choose which portion of the video to watch.

Moreover, this invention allows an individual user to move the various portions of video data around within the hierarchical index structure to group them in any desired fashion. For example, the groupings of FIG. 4 could be changed so that all scenes with the grandparents fit underneath a single recording session identifier. The scenes could then be grouped at various levels of detail depending on the desires of a user. The groupings, therefore, advantageously are not restricted to being merely in sequential order as the video data is recorded on the storage medium. Instead, the groupings can be tailored to the desires of the individual depending on the content of a particular video tape. Additionally, the index structure can be rearranged into several configurations for a single video tape.

Figure 5:
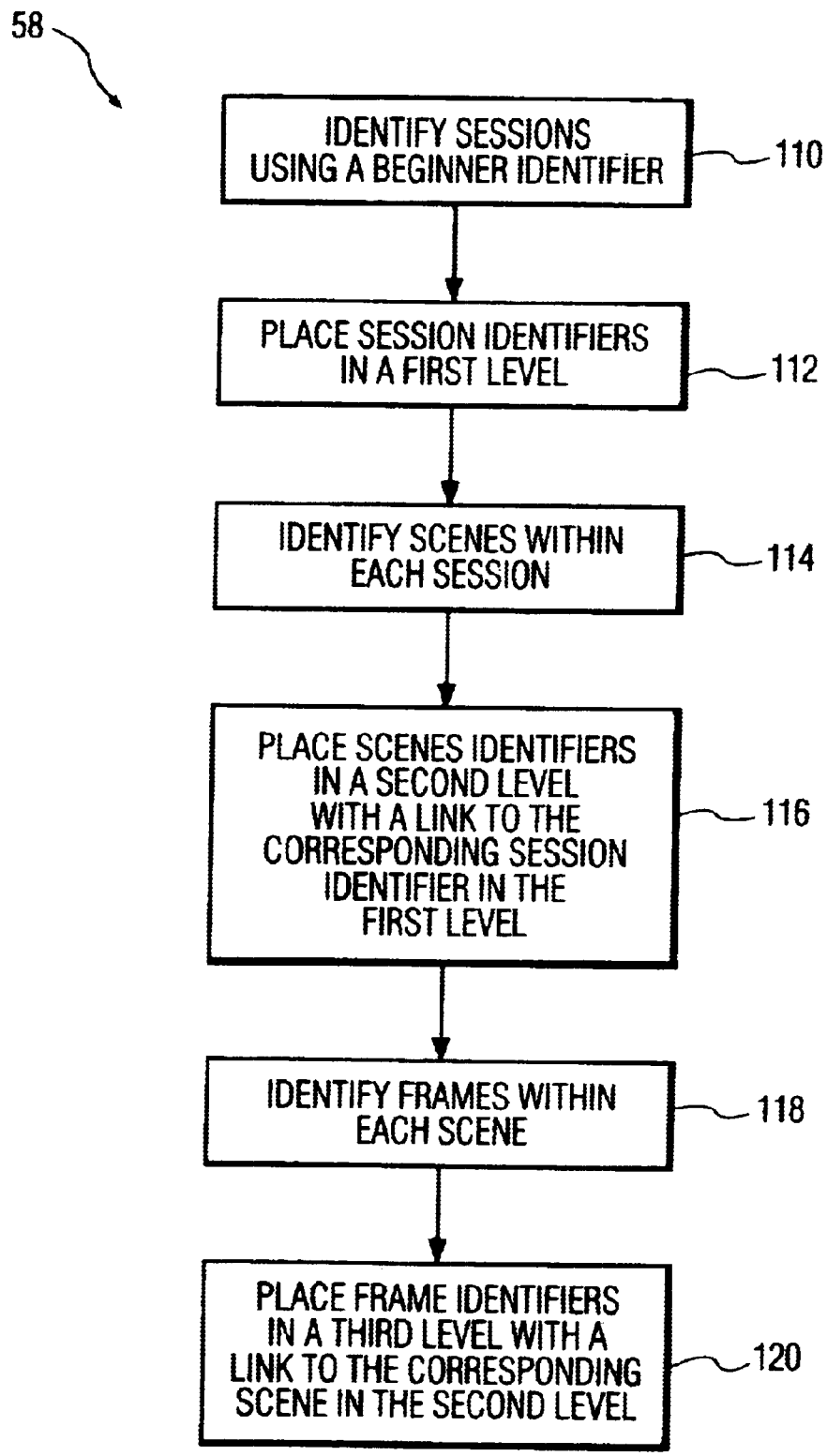
FIG. 5 is a flow chart diagram summarizing a portion of the method of this invention.

FIG. 5 summarizes the preferred method for establishing the structured index of the video data. The steps illustrated in FIG. 5 are substeps of the arrangement step 58 from FIG. 2.

Referring to FIG. 5, each session is identified at 110 and a beginning identifier for each session is placed in a first level at 112. The technique for identifying the different sessions can be accomplished in one of several ways.

In one example, where home video recordings are made, the person operating the camera can provide an identifier on the storage medium indicating the beginning of a new recording session. Alternatively, the controller 40 can read the recorded video data and detect changes in the video as described above. Different threshold levels for differences between adjacent frames can be used to identify whether a change is one between scenes or between recording sessions, for example. Methods of establishing different threshold levels for detecting different video recording sessions (compared to different scenes) are known in the art and, therefore, need not be further described in this specification.

Once the sessions are identified and the session identifiers are placed in the first level, the different scenes within each session preferably are identified at 114. The scene identifiers, which preferably are the identifiers such as VASS pulses at the beginning of each scene, are then placed in a second level at 116. Importantly, each scene identifier is linked to the corresponding session identifier in the first level.

Then within each scene, different portions such as frames are identified at 118. The frame identifiers are placed in a third level at 120 with a link to the corresponding scene in the second level.

Of course, the terms session, hierarchical, scene and frame are used for illustration purposes and different descriptions of different portions of the video data can be substituted depending on the content of a particular video tape, for example.

The method steps illustrated in FIG. 5 can be performed automatically by the controller 40. Alternatively, a user may interact with the controller 40 while viewing the content of the video tape and establish the hierarchical index structure using the input device 30. In either situation, the steps need not be completed in a sequential order as illustrated provided that links between the various levels are established.

In one example, the display 22 is controlled so that it displays the images of the video data on a first portion of the display and a grid to establish the index structure 64 on a second portion of the display simultaneously. This allows a user to conveniently establish a structured grouping of the contents of a particular video tape. Additionally, once the structure is accomplished (whether automatically by the controller 40 or by the user) the identifiers of the different video portions can be moved around within the structure and the structure can be rearranged to achieve the relationships between video portions desired by the user.

Once the user is satisfied with the arrangement 64 that preferably is stored for later use. In one example, the hierarchical index structure information is stored in the memory 42 along with the tape identifier 66. A corresponding tape identifier is placed onto the video storage medium by the write portion 44. The controller 40 can then subsequently correlate the index information from the memory 40 with the particular video tape to which it corresponds.

In another arrangement, data regarding the index structure is recorded onto the video storage medium by the write portion 44. This can be accomplished in a variety of ways provided that the controller 40 is able to subsequently access that information and determine the structure of the index. By recording the index structure information directly on the video storage medium, an advantage is provided that the index structure is available with more than one system 20.

Given this description, those skilled in the art will be able choose from among available microprocessors or computers or to custom design circuitry to perform the functions of the controller. Additionally, those skilled in the art having the benefit of this description will have the ability to develop the software or other programming necessary to accomplish the results described above.

This invention can be embodied in a physical arrangement as illustrated in FIG. 1 or in a computer readable program that is stored on a portable storage medium such as a magnetic or compact disc. Alternatively, a combination of the two is possible. In that regard, this specification refers to program modules as portions of the system that accomplish corresponding results. Program modules, therefore, refer to software, discrete hardware components or portions of integrated circuit chips, for example, that are specifically designed to perform in a chosen manner. While the term program module can be construed to be a subroutine within the programming of the controller 40, it need not be limited in that manner.

The preceding description provides example implementations of this invention. Variations and modifications may become apparent to those skilled in the art that do not necessarily depart from the basis of this invention. The scope of legal protection given to this invention can only be determined by studying the following claims.

The following is claimed:

1. A method of indexing portions of video data on a sequentially accessed storage medium for selectively viewing the portions in a chosen order, comprising the steps of:

(A) determining locations of the portions of the video data on the storage;

(B) assigning an identifier to the location of each portion; and (C) arranging the identifiers into an arrangement where at least a first one of the identifiers is related to a second one of the identifiers such that the portion corresponding to the second identifier is a component of the portion corresponding to the first identifier.

2. The method of claim 1, wherein step (C) includes arranging the identifiers into a hierarchical structure having a plurality of levels and wherein the first identifier is placed into a first level and the second identifier is placed into a second level that is a sublevel of the first level.

3. The method of claim 2, wherein the video portions include a plurality of sessions and a plurality of scenes within each session and wherein step (C) includes placing the identifiers corresponding to a beginning of each session in the first level, placing the identifiers corresponding to a beginning of each scene in the second level and linking each scene identifier to a corresponding one of the session identifiers in the first level.

4. The method of claim 3, wherein each scene includes a plurality of frames and wherein step (C) includes placing the identifiers corresponding to a beginning of each frame in a third level and linking each frame identifier to a corresponding one of the scene identifiers in the second level.

5. The method of claim 4, including selectively displaying a visual representation of selected ones of the levels on a display screen.

6. The method of claim 1, including selectively displaying a visual representation of the arrangement of step (C) on a display screen.

7. The method of claim 6, including choosing selected ones of the identifiers, assigning a sequential order to the selected identifiers and viewing the portions corresponding to the selected identifiers in the chosen sequential order.

8. The method of claim 1, wherein the storage medium is a video cassette and step (B) includes using VASS pulses as the identifiers.

9. The method of claim 1, wherein the storage medium has a beginning and step (B) includes assigning a location of the portions relative to the beginning of the storage medium and providing a description indicative of content of each portion.

10. The method of claim 1, wherein step (A) includes determining locations of scene changes by determining a difference in a video characteristic between adjacent frames of the video data, comparing the difference to a preselected threshold and identifying a scene change where the difference is greater than the threshold.

11. A system for indexing portions of video data on a sequentially accessed storage medium for viewing the portions in a chosen order, comprising:

a video player portion that reads the video data on the storage medium and generates signals indicative of the content of the video data;

a recorder portion that selectively writes information on the storage medium; and a controller that communicates with the video player portion and the recorder portion and determines locations of the portions of the video data on the storage medium, directs the recorder portion to assign an identifier to the location of each portion and arranges the identifiers into an arrangement where at least a first one of the identifiers is related to a second one of the identifiers such that the portion corresponding to the second identifier is a component of the portion corresponding to the first identifier.

12. The system of claim 11, including a user input portion that is selectively used to direct the controller to arrange the identifiers in a chosen arrangement and the controller assigns new identifiers to the portions that are indicative of the chosen arrangement.

13. The system of claim 11, including a display that selectively displays the video data responsive to the signals generated by the video player portion and that selectively displays the arrangement of the identifiers responsive to signals from the controller.

14. The system of claim 13, including a user input portion that is selectively used to communicate with the controller to responsively direct the display to display only selected portions of the arrangement.

15. The system of claim 14, wherein the user input portion is used to communicate with the controller to responsively direct the video player portion to play selected ones of the portions in a chosen sequential order.

16. The system of claim 11, wherein the arrangement of the identifiers includes a plurality of levels and the first identifier is in a first level and the second identifier is in a second level that is a sublevel of the first level.

17. The system of claim 16, wherein the video portions include a plurality of sessions, a plurality of scenes within each session and a plurality of frames within each scene and wherein the controller arranges the identifiers such that the identifiers corresponding to a beginning of each session are in the first level, the identifiers corresponding to a beginning of each scene are in the second level, each scene identifier is linked to a corresponding one of the session identifiers in the first level, the identifiers corresponding to a beginning of each frame are in a third level and each frame identifier is linked to a corresponding one of the scene identifiers in the second level.

18. The system of claim 11, wherein the storage medium is a video cassette and the identifiers include VASS pulses.

19. The system of claim 11, wherein the storage medium has a beginning and each identifier includes an indication of a location of each portion relative to the beginning of the storage medium and at least one of the identifiers includes a description indicative of content of the at least one portion.

20. The system of claim 11, wherein the video data comprises a plurality of frames and the controller determines the locations of the portions by determining a difference in a video characteristic between adjacent frames of the video data, comparing the difference to a preselected threshold and identifying locations of different portions where the determined difference is greater than the threshold.

21. A computer-readable medium having a plurality of computer-executable instructions to execute process steps for indexing a plurality of portions of video data on a sequentially accessed video storage medium for selectively viewing the portions in a chosen order, the computer-executable instructions comprising:

a first program module for determining locations of the portions of the video data on the video storage medium;

a second program module for assigning an identifier to the location of each portion; and a third program module for arranging the identifiers into an arrangement where at least a first one of the identifiers is related to a second one of the identifiers such that the portion corresponding to the second identifier is a component of the portion corresponding to the first identifier.

22. The computer-readable medium of claim 21, wherein the third program module includes computer instructions for arranging the identifiers into a plurality of levels, placing the first identifier into a first level and placing the second identifier into a second level that is a sublevel of the first level.

23. The computer-readable medium of claim 22, wherein the video portions include a plurality of sessions and a plurality of scenes within each session and wherein the third program module includes computer instructions for placing the identifiers corresponding to a beginning of each session in the first level, placing the identifiers corresponding to a beginning of each scene in the second level and linking each scene identifier to a corresponding one of the session identifiers in the first level.

24. The computer-readable medium of claim 23, wherein each scene includes a plurality of frames and wherein the third program module includes computer instructions for placing the identifiers corresponding to a beginning of each frame in a third level and linking each frame identifier to a corresponding one of the scene identifiers in the second level.

25. The computer-readable medium of claim 24, including computer instructions for selectively displaying a visual representation of selected ones of the levels on a display screen.

26. The computer-readable medium of claim 21, including computer instructions for choosing selected ones of the identifiers, assigning a sequential order to the selected identifiers and viewing the portions corresponding to the selected identifiers in the assigned sequential order.

27. The computer-readable medium of claim 21, wherein the video storage medium has a beginning and the second program module includes instructions for assigning a location of each portion relative to the beginning of the video storage medium and for selectively providing a description indicative of content of each portion.

28. The computer-readable medium of claim 21, wherein the first program module includes instructions for determining locations of the portions by determining a difference in a video characteristic between adjacent frames of the video data, comparing the difference to a preselected threshold and identifying a change in portions where the difference is greater than the threshold.

* * * * *